United States Patent

Degner et al.

(10) Patent No.: US 7,785,727 B2
(45) Date of Patent: Aug. 31, 2010

(54) COMBINED ANODE INLET, ANODE BLEED, AND ANODE FLOW SHIFT VALVE MECHANISM

(75) Inventors: Andrew V. Degner, Rochester, NY (US); Jon R. Sienkowski, Rochester, NY (US)

(73) Assignee: GM Global Technology Operations, Inc., Detroit, MI (US)

(*) Notice: Subject to any disclaimer, the term of this patent is extended or adjusted under 35 U.S.C. 154(b) by 842 days.

(21) Appl. No.: 11/624,971

(22) Filed: Jan. 19, 2007

(65) Prior Publication Data

US 2008/0173364 A1 Jul. 24, 2008

(51) Int. Cl.
*H01M 2/00* (2006.01)

(52) U.S. Cl. .................. 429/34; 429/512; 137/625.31
(58) Field of Classification Search .................. 429/34; 137/625.31
See application file for complete search history.

(56) References Cited

U.S. PATENT DOCUMENTS

2002/0033194 A1* 3/2002 Gagnon .................. 137/875

* cited by examiner

*Primary Examiner*—Jane Rhee
(74) *Attorney, Agent, or Firm*—Fraser Clemens Martin & Miller LLC; J. Douglas Miller

(57) ABSTRACT

A valve mechanism is disclosed, the valve mechanism including a rotor and stator adapted for selectively providing a flow of hydrogen to and selectively bleeding the hydrogen from a plurality fuel cell stacks.

19 Claims, 3 Drawing Sheets

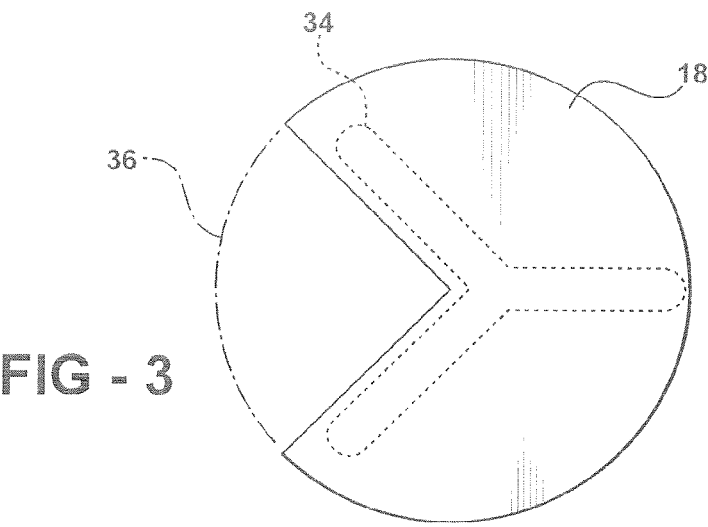
FIG - 3
FIG - 4A
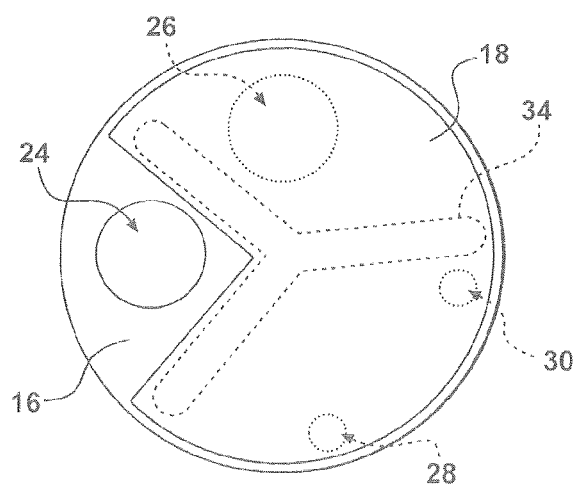
FIG - 4B
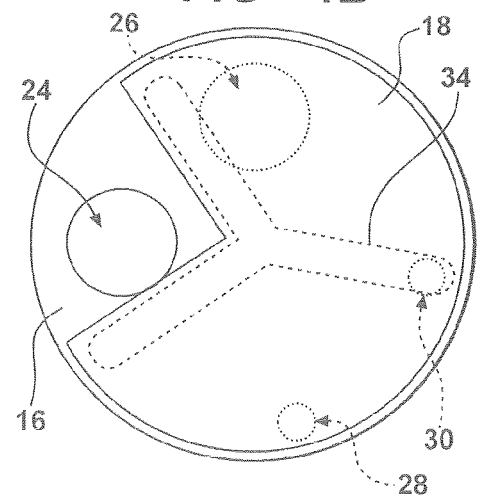
FIG - 4C
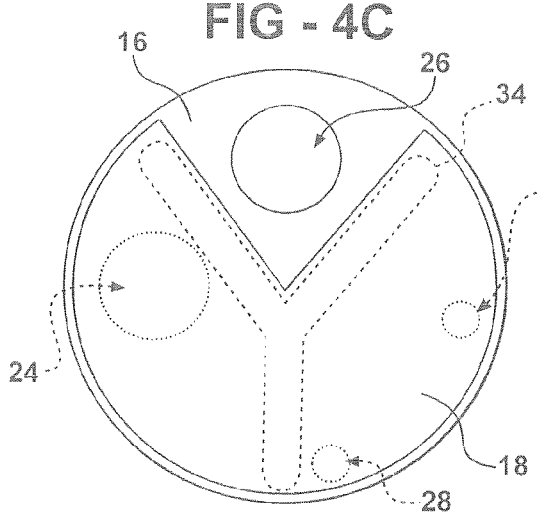
FIG - 4D
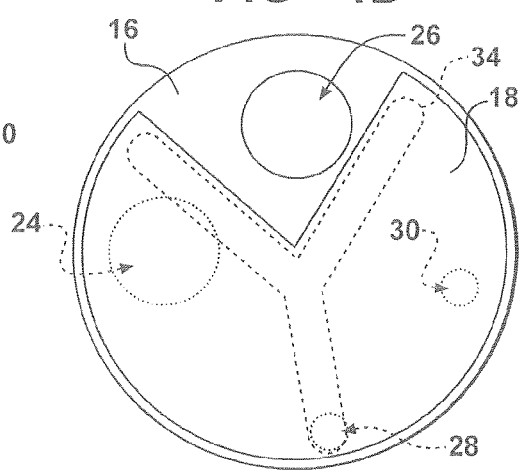

COMBINED ANODE INLET, ANODE BLEED, AND ANODE FLOW SHIFT VALVE MECHANISM

FIELD OF THE INVENTION

The invention relates generally to a fuel cell system valve mechanism, and more particularly, to a valve mechanism adapted for selectively providing a flow of hydrogen to and selectively bleeding the hydrogen from a plurality fuel cell stacks.

BACKGROUND OF THE INVENTION

Fuel cells have been proposed as a power source for electric vehicles and other applications. In proton exchange membrane (PEM) type fuel cells, hydrogen is supplied to an anode of the fuel cell and oxygen is supplied as an oxidant to a cathode. A typical fuel cell system includes a plurality of fuel cells stacked together in a fuel cell stack. Typically, numerous fuel cell stacks are required to power a fuel cell powered vehicles. Large amounts of hydrogen, stored in fuel tanks on an undercarriage of the vehicle, are supplied to each of the fuel cell stacks to power the vehicle.

Current fuel cell systems include a valve mechanism associated with an inlet and a bleed conduit of the anode subsystem of each fuel cell stack. As many as eight valve mechanisms may be required to properly supply hydrogen to and bleed hydrogen from the fuel cell stacks. Each valve mechanism may include associated components, such as an injector, a solenoid, and a control system, for example. Numerous valve mechanisms and associated components occupy a relatively large amount of space in the fuel cell vehicle.

It would be desirable to develop an improved anode subsystem valve mechanism adapted for selectively providing a hydrogen flow to and selectively bleeding the hydrogen from a plurality of fuel cell stacks.

SUMMARY OF THE INVENTION

Concordant and congruous with the present invention, an anode subsystem valve mechanism adapted for selectively providing a hydrogen flow to and selectively bleeding the hydrogen from a plurality of fuel cell stacks, has surprisingly been discovered.

In one embodiment, A valve mechanism comprises a valve body having an inlet in fluid communication with a source of fluid; an actuator disposed in said valve body; a stator disposed in said body valve and having a plurality of apertures; and a rotor having a flow channel formed therein, said rotor rotatably connected to said actuator and disposed between said actuator and said stator in said valve body, rotation of said rotor facilitating selective flow of a fluid from the fluid source, through said valve body, through at least one of the apertures, and selectively to one of a plurality of fuel cell stacks.

In another embodiment, A fuel cell system comprises a plurality of fuel cell stacks; a valve body having an inlet in fluid communication with a fluid, disposed adjacent said actuator; an actuator disposed in said valve body; a stator disposed in said valve body having a plurality of apertures, wherein the plurality of apertures includes at least a first flow aperture in fluid communication with a first fuel cell stack and a second flow aperture in fluid communication with a second of fuel cell stack; and a rotor having a flow channel formed therein, said rotor rotatably connected to said actuator and disposed between said actuator and said stator in said valve body, rotation of said rotor facilitating selective flow of a fluid from the fluid source, through said valve body, selectively through at least one of the flow apertures, and to one of a plurality of fuel cell stacks, wherein the flow channel of said rotor is positioned over the plurality of apertures to selectively permit a flow of the fluid to or a bleed of the fluid from the plurality of fuel cell stacks.

In another embodiment, A valve mechanism comprises a valve body having an inlet in fluid communication with a fluid, disposed adjacent said actuator; an actuator disposed in said valve body; a stator having a first flow aperture, a second flow aperture, a first bleed aperture, and a second bleed aperture, wherein the first flow aperture is in fluid communication with a first fuel cell stack and the second flow aperture is in fluid communication with a second fuel cell stack; a rotor having a flow channel formed therein, said rotor rotatably connected to said actuator and disposed between said actuator and said stator in said valve body, rotation of said rotor facilitating selective flow of a fluid from the fluid source, through said valve body, selectively through at least one of the flow apertures, and to one of a plurality of fuel cell stacks, wherein the flow channel of said rotor is positioned over the plurality of apertures to selectively permit a flow of the fluid to or a bleed of the fluid from the plurality of fuel cell stacks.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 3 is an elevational view of a rotor of the valve mechanism of FIG. 1;

FIG. 4*a* is an elevational view of the rotor and the stator shown in FIG. 1 illustrating the valve mechanism in a first position;

FIG. 4*b* is an elevational view of the rotor and the stator shown in FIG. 1 illustrating the valve mechanism in a second position;

FIG. 4*c* is an elevation view of the rotor and the stator shown in FIG. 1 illustrating the valve mechanism in a third position;

FIG. 4*d* is an elevational view of the rotor and the stator shown in FIG. 1 illustrating the valve mechanism in a fourth position;

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner.

Figure 1:
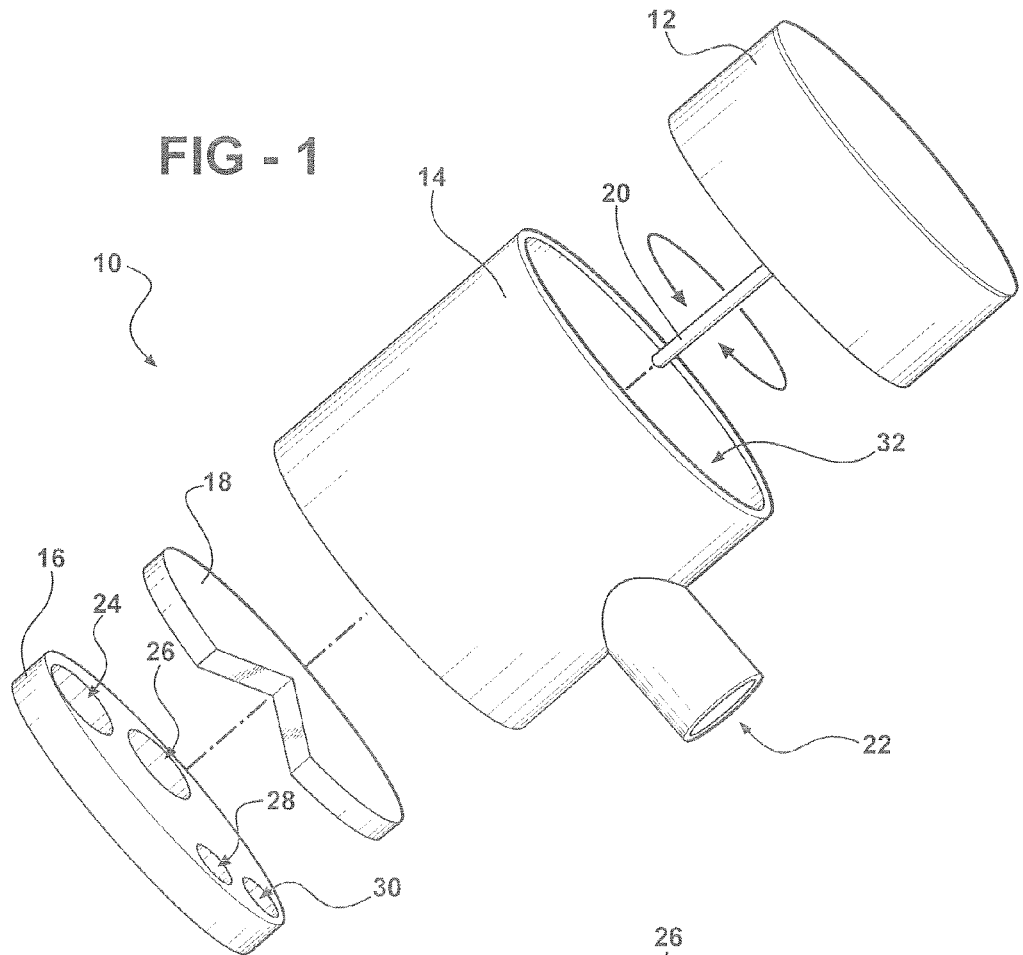
FIG. 1 is an exploded perspective view of a valve mechanism according to an embodiment of the invention.

FIG. 1 shows a valve mechanism 10 according to an embodiment of the invention. The valve mechanism 10 includes an actuator 12, a valve body 14, a stator 16, and a rotor 18. It is understood that the valve mechanism 10 may be formed any conventional material such as steel, a steel alloy, a ceramic composite, a plastic composite, and a combination thereof, for example.

The actuator 12 is disposed in the valve body 14 of the valve mechanism 10 and is connected to the rotor 18 by a rotatable axle 20. It is understood that the actuator 12 may be any conventional actuator such as a rotary solenoid, a DC motor, a stepper motor, or a torque motor, for example. It is further understood that the actuator 12 may be disposed outside and adjacent to the valve mechanism 10 as desired.

The valve body 14 includes an inlet 22 in fluid communication with a source (not shown) of a first fluid (not shown). The first fluid may be any fluid such as hydrogen, oxygen, nitrogen, or air, for example. In the embodiment shown, the valve body 14 has a generally cylindrical shape with a circular cross-sectional shape. The valve body 14 forms a cavity 32 adapted to receive the actuator 12, the stator 16, and the rotor 18. It is understood that the valve body 14 may have any shape, as desired. It is further understood that the actuator 12, the stator 16, and the rotor 18 may be fully disposed in, partially disposed in, or substantially abutting an exterior of the valve body 14, as desired.

Figure 2:
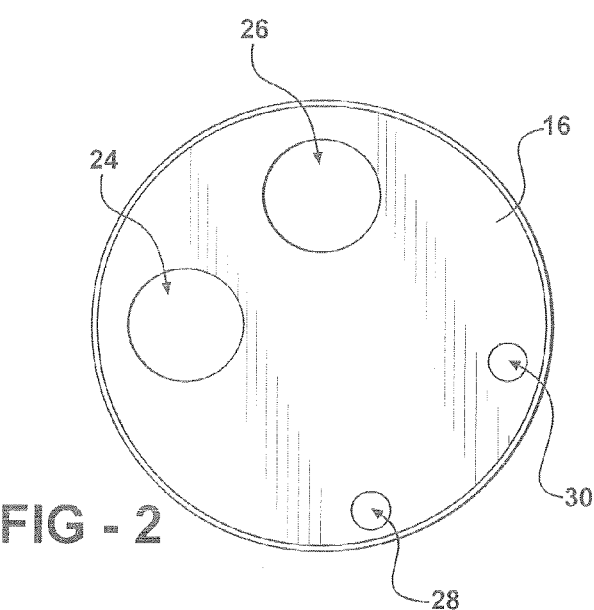
FIG. 2 is an end view of a stator of the valve mechanism of FIG. 1.
Figure 5:
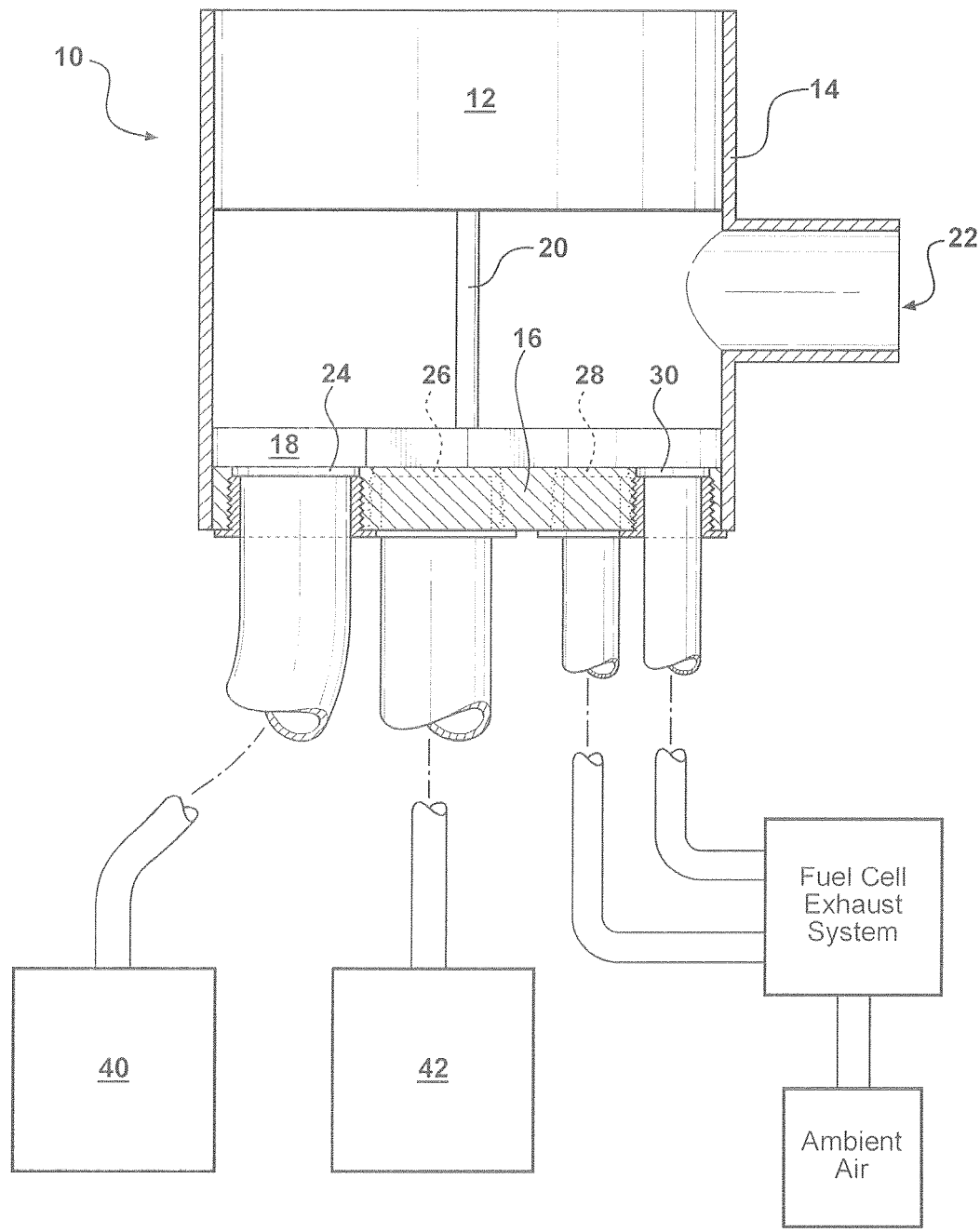
FIG. 5 is a schematic view of a plurality of fuel cell stacks with a sectional view of the valve mechanism of FIG. 1.

The stator 16 includes a first flow aperture 24, a second flow aperture 26, a first bleed aperture 28, and a second bleed aperture 30. In the embodiment shown, the stator 16 is disposed in the valve body 14 of the valve mechanism 10 and abuts the rotor 18, also disposed in the valve body 14. As shown in FIG. 5, the first flow aperture 24 is in fluid communication with an anode side (not shown) of a first fuel cell stack 40, and the second flow aperture 26 is in fluid communication with an anode side (not shown) of a second fuel cell stack 42. The first bleed aperture 28 and the second bleed aperture 30 are in fluid communication with the fuel cell system exhaust which is in communication with ambient air. It is understood that the bleed apertures 28, 30 may be in fluid communication with the first and the second fuel cell stacks 40, 42 and the ambient air, as desired. As shown in FIG. 2, the stator 16 has a substantially circular shape. It is understood that the stator 16 may have any shape, as desired. The flow apertures 24, 26 are substantially circular. The bleed apertures 28, 30 are substantially circular and have a diameter less than a diameter of the flow aperture 24, 26. It is understood that the apertures, 24, 26, 28, 30 may have any shape and diameter, as desired.

The rotor 18 includes a flow channel 34 is connected to the axle 20 of the actuator 12 to be rotatable therewith. The rotor 18 is disposed in the cavity 32 of the valve body 14 substantially abutting the stator 16. As shown in FIG. 3, the rotor 18 has a circular shape with a circle sector 36 removed. A circle sector, also known as a pie piece, is defined as the portion of a circle enclosed by two radii and an arc. It is understood that the rotor 18 may have any shape, as desired. It is further understood that the portion of the rotor 18 removed may have any shape, such as a crescent shape, a substantially triangular shape, and a substantially rectangular shape, for example. A flow channel 34 is formed in a surface of the rotor 18. In the embodiment shown, the flow channel 34 is substantially a y-shaped, however, it is understood that the flow channel 34 may have any shape such as a t-shape and a v-shape, for example.

Generally, during operation of a fuel cell power system, such as the fuel cell power system of U.S. Pat. No. 6,939,631 for FUEL CELL SYSTEM AND METHOD OF OPERATION hereby incorporated by reference, a stream of hydrogen is fed into the anode side of the fuel cell stack. Concurrently, a stream of oxygen is fed into the cathode side of the fuel cell stack. On the anode side, the hydrogen in the hydrogen stream is catalytically split into protons and electrons. The oxidation half-cell reaction is represented by: $H_2 \leftrightarrow 2H^+ + 2e^-$. In a polymer electrolyte membrane fuel cell, the protons permeate through the membrane to the cathode side. The electrons travel along an external load circuit to the cathode side creating the current of electricity of the fuel cell stack. On the cathode side, the oxygen in the oxidant stream reacts with the protons permeating through the membrane and the electrons from the external circuit to form water molecules. This reduction half-cell reaction is represented by: $4H^+ + 4e^- + O_2 \leftrightarrow 2H_2O$. Anode exhaust from the anode side flows through a backpressure control valve (not shown) to a combustor. Cathode exhaust from the cathode side flows through a second backpressure control valve (not shown) to the combustor. A control module (not shown) regulates the conditions of the hydrogen stream, oxygen stream, and exhaust streams by operating various control valves (not shown), backpressure control valves (not shown), and compressors (not shown) in response to signals from pressure sensors (not shown) and electrical power sensors (not shown) connected to the fuel cell stacks 40, 42.

During operation of the fuel cell system, the valve mechanism 10 is in fluid communication with the hydrogen source, the first fuel cell stack 40, and the second fuel cell stack 42. A stream of hydrogen is caused to flow from the hydrogen source and through the inlet 22 into the valve mechanism 10. As the hydrogen flows into the valve mechanism 10, the actuator 12 is caused to rotate the rotor 18 by a controller (not shown). The rotor 18 is caused to rotate relative to the stator 16 to one of four positions based on input from the controller. It is understood that the number of positions in which the rotor 18 may be positioned depends upon the size and shape of the rotor, the number of fuel cell stacks to be supplied with hydrogen, and other similar design considerations. It is further understood that the controller may cause the actuator 12 to rotate the rotor based on a desired flow to the first fuel cell stack 40 or the second fuel cell stack 42, whether the fuel cell stacks 40, 42 are cold-starting or are at steady state, and other control variables, as desired. By providing fluid communication between the hydrogen source and each of the first fuel stack and the second fuel stack through the valve mechanism 10, a redundancy of valve mechanisms, conduit systems, and other components is avoided and the space occupied by the valve mechanism is minimized.

In a first position shown in FIG. 4a, the rotor 18 is caused to block the second flow aperture 26, the first bleed aperture 28, and the second bleed aperture 30 of the stator 16. The circle sector 36 is positioned over the first flow aperture 24. With the circle sector 36 over the first flow aperture 24, hydrogen is allowed to flow from the source, through the inlet 22, through the valve mechanism 10 and the first flow aperture 24, and to the first fuel cell stack 40.

In a second position shown in FIG. 4b, the rotor 18 is caused to block the first bleed aperture 28, while the flow channel 34 of the rotor 18 is positioned over the second flow aperture 26 and the second bleed aperture 30. The circle sector 36 is positioned over the first flow aperture 24 to allow fluid communication between the first flow aperture 24 and the valve mechanism 10. The second position allows a flow of hydrogen from the hydrogen source, through the valve mechanism 10, and to the first fuel cell stack 40 while simultaneously allowing a bleed of hydrogen fluid from the second fuel cell stack 42 through the second flow aperture 26, through the flow channel 34, and out of the valve mechanism 10 through the second bleed aperture 30.

In a third position shown in FIG. 4c, the rotor 18 is caused to block the first flow aperture 24, the first bleed aperture 28, and the second bleed aperture 30 of the stator 16. The circle sector 36 is positioned over the second flow aperture 26. With the circle sector 36 positioned over the second flow aperture 30, hydrogen is allowed to flow from the source, through the inlet 22, through the valve mechanism 10 and the first flow aperture 24, and to the second fuel cell stack 42.

In a fourth position shown in FIG. 4d, the rotor 18 is caused to block the second bleed aperture 30, while the flow channel 34 of the rotor 18 is positioned over the first flow aperture 24 and the first bleed aperture 28. The circle sector 36 is positioned over the second flow aperture 26 to allow fluid communication between the second flow aperture 26 and the valve mechanism 10. The fourth position allows a flow of hydrogen from the hydrogen source to the second fuel cell stack 42 while simultaneously allowing a bleed of hydrogen fluid from the first fuel cell stack 40 through the first flow aperture 26, through the flow channel 34, and out of the valve mechanism 10 through the first bleed aperture 28.

By proving a single valve mechanism 10 in fluid communication with the hydrogen source and each of the first fuel stack and the second fuel stack, a redundancy of valve mechanisms, conduit systems, and other components is avoided. By minimizing redundant components, the space occupied by the components is minimized thereby maximizing the space available to be occupied by a fuel tank (not shown), the first fuel stack, the second fuel stack, or other system components, as desired. Additionally, a single actuator 12 is provided to control the valve mechanism 10 thereby reducing the number of actuators required and further maximizing the space available for other system components. By minimizing the number of actuators and valve mechanisms adapted to regulate the hydrogen feed, the overall control of the hydrogen feed and the hydrogen bleed is simplified.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A valve mechanism comprising:
    a valve body having an inlet in fluid communication with a source of fluid;
    an actuator disposed in said valve body;
    a stator disposed in said valve body and having a plurality of apertures; and
    a rotor having a flow channel formed therein, said rotor rotatably connected to said actuator and disposed between said actuator and said stator in said valve body, rotation of said rotor facilitating selective flow of a fluid from the fluid source, through said valve body, through at least one of the apertures, and selectively to one of a plurality of fuel cell stacks, wherein the plurality of apertures includes a first flow aperture and a second flow aperture in fluid communication with a first fuel cell stack and a second fuel cell stack, respectively.

2. The valve mechanism of claim 1, wherein the first flow aperture is in fluid communication with an anode side of the first fuel cell stack and the second flow aperture is in fluid communication with an anode side of the second fuel cell stack.

3. The valve mechanism of claim 1, wherein the plurality of apertures include a first bleed aperture and a second bleed aperture in fluid communication with one of the first fuel cell stack, the second fuel cell stack, ambient air, the fuel cell exhaust system, and a source of the fluid.

4. The valve mechanism of claim 1, wherein the flow channel of said rotor is substantially y-shaped.

5. The valve mechanism of claim 1, wherein the fluid is hydrogen.

6. The valve mechanism of claim 1, wherein said rotor is substantially circular with a circle sector removed.

7. The valve mechanism of claim 1, wherein the actuator is one of a rotary solenoid, a DC motor, a torque motor, and a stepper motor.

8. The valve mechanism of claim 1, wherein the valve mechanism is formed from one of steel, a steel alloy, a ceramic composite, and a plastic composite.

9. The valve mechanism of claim 1, wherein said rotor abuts said stator.

10. The valve mechanism of claim 9, wherein a lubricant is disposed between said rotor and said stator.

11. The valve mechanism of claim 9, wherein said rotor and said stator are formed from materials adapted to minimize a coefficient of friction between said rotor and said stator.

12. A fuel cell system comprising:
    a plurality of fuel cell stacks;
    a valve body having an inlet in fluid communication with a fluid, disposed adjacent said actuator;
    an actuator disposed in said valve body;
    a stator disposed in said valve body having a plurality of apertures, wherein the plurality of apertures includes at least a first flow aperture in fluid communication with a first fuel cell stack and a second flow aperture in fluid communication with a second of fuel cell stack; and
    a rotor having a flow channel formed therein, said rotor rotatably connected to said actuator and disposed between said actuator and said stator in said valve body, rotation of said rotor facilitating selective flow of a fluid from the fluid source, through said valve body, selectively through at least one of the flow apertures, and to one of a plurality of fuel cell stacks, wherein the flow channel of said rotor is positioned over the plurality of apertures to selectively permit a flow of the fluid to or a bleed of the fluid from the plurality of fuel cell stacks.

13. The fuel cell system of claim 12, wherein the flow channel of said rotor is substantially y-shaped.

14. The fuel cell system of claim 12, wherein the fluid is hydrogen.

15. The fuel cell system of claim 12, wherein said rotor is substantially circular with a circle sector removed.

16. The fuel cell system of claim 12, wherein the actuator is one of a rotary solenoid, a DC motor, a torque motor, and a stepper motor.

17. The fuel cell system of claim 12, wherein said rotor abuts said stator.

18. A valve mechanism comprising:
    a valve body having an inlet in fluid communication with a fluid, disposed adjacent said actuator;
    an actuator disposed in said valve body;
    a stator having a first flow aperture, a second flow aperture, a first bleed aperture, and a second bleed aperture, wherein the first flow aperture is in fluid communication with a first fuel cell stack and the second flow aperture is in fluid communication with a second fuel cell stack;
    a rotor having a flow channel formed therein, said rotor rotatably connected to said actuator and disposed between said actuator and said stator in said valve body, rotation of said rotor facilitating selective flow of a fluid from the fluid source, through said valve body, selectively through at least one of the flow apertures, and to one of a plurality of fuel cell stacks, wherein the flow channel of said rotor is positioned over the plurality of apertures to selectively permit a flow of the fluid to or a bleed of the fluid from the plurality of fuel cell stacks.

19. The valve mechanism of claim 18, wherein the first flow aperture is in fluid communication with an anode side of the first fuel cell stack and the second flow aperture is in fluid communication with an anode side of the second fuel cell stack.

* * * * *